(12) United States Patent
Pan et al.

(10) Patent No.: US 7,790,074 B2
(45) Date of Patent: Sep. 7, 2010

(54) STEREOLITHOGRAPHIC METHOD FOR FORMING THREE-DIMENSIONAL STRUCTURE

(75) Inventors: Alfred I-Tsung Pan, Sunnyvale, CA (US); Laurie S. Mittelstadt, Belmont, CA (US)

(73) Assignee: Houston-Packard Development Company, L.P., Houston, TX (US)

( * ) Notice: Subject to any disclaimer, the term of this patent is extended or adjusted under 35 U.S.C. 154(b) by 1542 days.

(21) Appl. No.: 10/629,742

(22) Filed: Jul. 30, 2003

(65) Prior Publication Data
US 2005/0025905 A1 Feb. 3, 2005

(51) Int. Cl.
B29C 41/02 (2006.01)
B29C 41/22 (2006.01)
B29C 41/52 (2006.01)

(52) U.S. Cl. .................. 264/40.1; 264/255; 264/298; 264/308

(58) Field of Classification Search .................. 264/308, 264/401, 221, 255, 463, 298; 427/189, 191, 427/475; 425/174.4; 228/187, 190, 111.5; 164/58.1, 81, 40.1
See application file for complete search history.

(56) References Cited

U.S. PATENT DOCUMENTS

| | | | | |
|---|---|---|---|---|
| 2,812,270 | A * | 11/1957 | Alexander | .................. 427/178 |
| 4,744,821 | A | 5/1988 | Yabuki et al. | |
| 5,043,182 | A | 8/1991 | Schultze et al. | |
| 5,207,371 | A * | 5/1993 | Prinz et al. | .................. 228/125 |
| 5,257,657 | A | 11/1993 | Gore | |
| 5,259,593 | A | 11/1993 | Orme et al. | |
| 5,286,573 | A | 2/1994 | Prinz et al. | |
| 5,301,415 | A * | 4/1994 | Prinz et al. | .................. 29/458 |
| 5,301,863 | A * | 4/1994 | Prinz et al. | .................. 228/33 |
| 5,510,066 | A * | 4/1996 | Fink et al. | .................. 264/40.1 |
| 5,560,543 | A | 10/1996 | Smith et al. | |
| 5,695,708 | A * | 12/1997 | Karp et al. | .................. 264/401 |
| 5,722,479 | A | 3/1998 | Oeftering | |
| 5,740,051 | A * | 4/1998 | Sanders et al. | .............. 700/119 |
| 5,779,971 | A | 7/1998 | Pan et al. | |
| 5,876,615 | A | 3/1999 | Predetechensky | |
| 5,960,853 | A | 10/1999 | Sterett et al. | |
| 6,019,814 | A * | 2/2000 | Horine | .................. 75/335 |
| 6,076,723 | A | 6/2000 | I-Tsung Pan | |
| 6,193,922 | B1 * | 2/2001 | Ederer | .................. 264/401 |
| 6,267,919 | B1 | 7/2001 | Tanaka et al. | |

(Continued)

FOREIGN PATENT DOCUMENTS

JP 60-114508 6/1985

OTHER PUBLICATIONS

"Stereolithography", 2 pgs., HTTP://www.cs.hut.fi/ ado/rp/subsection3_6_1.html.

(Continued)

*Primary Examiner*—Leo B Tentoni

(57) ABSTRACT

A method of forming a three-dimensional object comprises ejecting drops of liquefied material into a vat using an ejector; scanning the ejector in first and second mutually opposed directions to induce the drops of liquefied material from the ejector to deposit and solidify in a predetermined sequence to sequentially form layers of the three-dimensional object; supplying a viscous liquid into the vat to a level which is essentially level with the top of a most recently formed layer of the three-dimensional object; and raising the level of the viscous liquid in accordance with the formation of new layers.

10 Claims, 2 Drawing Sheets

U.S. PATENT DOCUMENTS

| | | | |
|---|---|---|---|
| 6,309,711 B1 * | 10/2001 | Tseng et al. | 427/474 |
| 6,405,095 B1 * | 6/2002 | Jang et al. | 700/118 |
| 6,501,663 B1 | 12/2002 | Pan | |
| 6,579,479 B1 * | 6/2003 | Edie et al. | 264/13 |
| 6,838,035 B1 * | 1/2005 | Ederer et al. | 264/308 |
| 6,939,489 B2 * | 9/2005 | Moszner et al. | 264/255 X |
| 6,942,830 B2 * | 9/2005 | Mulhaupt et al. | 264/255 |
| 2002/0020945 A1 * | 2/2002 | Cho et al. | 264/460 |
| 2005/0215744 A1 * | 9/2005 | Wiese et al. | 526/319 |

OTHER PUBLICATIONS

T. Bosch et al., "A low-cost, optical feedback laser range-finder with chirp-control.", IEEE Instrumentation and Measurement, Technology Conference, Budapest, Hungary, May 21-23, 2001, 4 pgs.

* cited by examiner

STEREOLITHOGRAPHIC METHOD FOR FORMING THREE-DIMENSIONAL STRUCTURE

BACKGROUND OF THE INVENTION

Stereolithographic techniques for forming three dimensional polymer structures are know. However, these techniques are primarily directed to layer by layer hardening of a polymeric material using laser irradiation and are not applicable to the production of metallic items/structures which have complex shapes having overhangs/undercuts that require the interposition of supporting arrangements such as scaffolds. Therefore, the need for a technique which enables a metallic three-dimensional structure having a complex shape, to be developed in this layer-by-layer manner, exists.

DETAILED DESCRIPTION OF THE EXEMPLARY EMBODIMENTS

Figure 1:
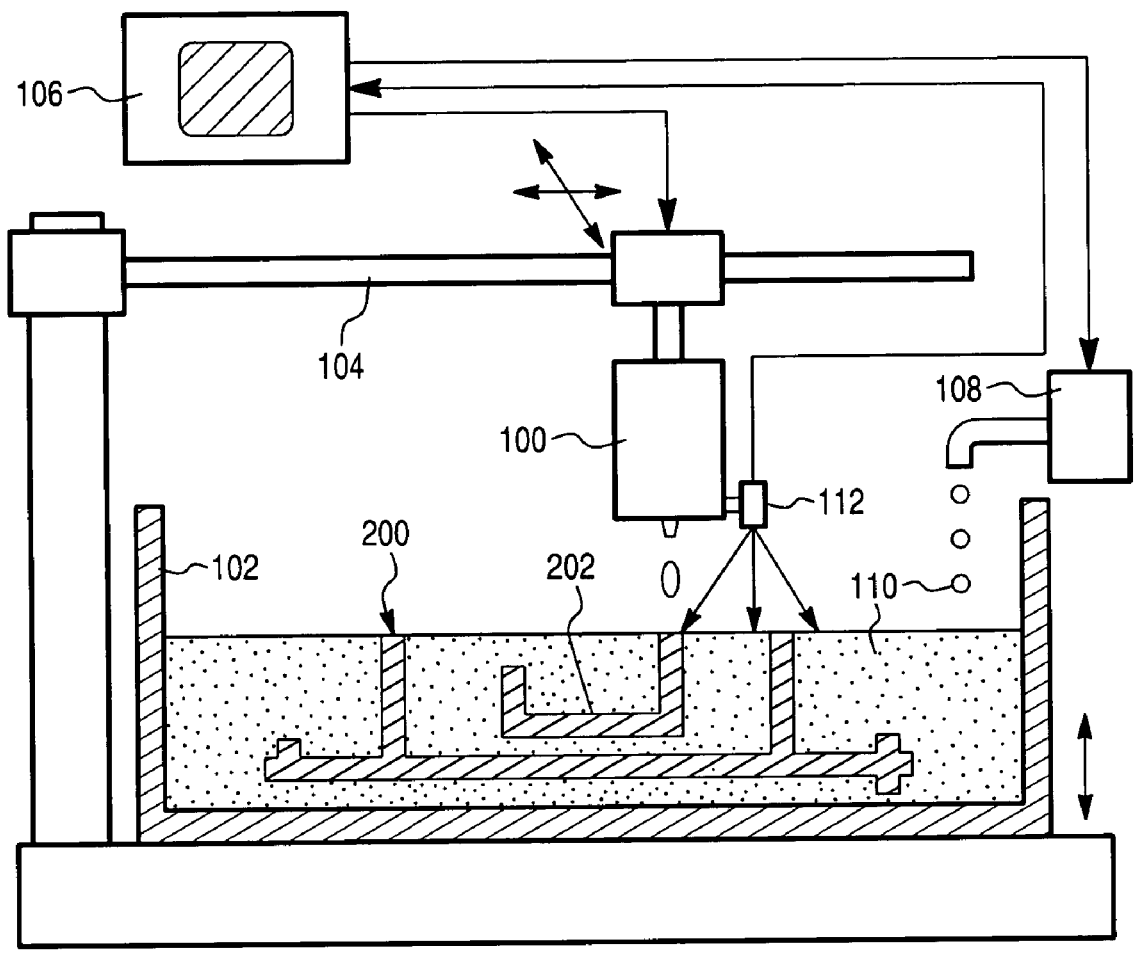
FIG. 1 is a schematic elevation showing the concept upon which a first embodiment of the invention is based.

FIG. 1 schematically depicts an embodiment of the invention. In this arrangement, an ejector 100 is supported over a bath or vat 102. The ejector 100 is operatively connected with a device 104 which scans the ejector back and forth along two mutually opposed axes. This scanning device 104 is operatively connected with a computer or the like type of NC controller 106 which also controls the ejection timing of the ejector 100.

Examples of ejectors of the type which are adaptable for use in this embodiment can be found in U.S. Pat. No. 6,076,723 issued on Jun. 20, 2000 in the name of Alfred I-Tsung Pan; and U.S. Pat. No. 5,779,971 issued on Jul. 14, 1998 in the name of I-Tsung Pan et al.

By ejecting droplets of liquefied/molten material from the ejector 100 over a predetermined pattern area it is possible to build a three-dimensional structure 200 layer-by-layer.

In order to ensure accurate formation of the three-dimensional structure, the ejector is maintained at essentially the same distance from the upper layer of the structure 200. This distance can be maintained by either moving (i.e. raising and lowering) the vat 102 with respect to the ejector or moving the ejector 100 with respect to the vat. Inasmuch as this technique is not dissimilar to inkjet printing, the ejector nozzle is maintained about 1-3 mm (by way of example only) from the upper layer in order to maximize the accuracy with which the three-dimensional structure is formed.

However, with the development of a number of layers which result in a structure that has overhang or extends upwardly at an angle, it becomes necessary to support the structure, at least temporarily, against the force of gravity. In this embodiment this support is provided by a highly viscous liquid 110 which is supplied into the vat. The viscous liquid can be any suitable material such as a suitable silicone oil, glycol or a mixture waxes, molten metal or the like, that is highly viscous at room temperature. It is, however, necessary that the support liquid/material is not detrimentally reactive with the ejection material.

As will be noted from FIG. 1, the viscous or support liquid not only provides lateral support but can actually function as a horizontal foundation on which droplets of liquefied/molten material can be ejected and allowed to solidify. For example, a suspended layer 202 can be formed without the use of a scaffold by selecting the characteristics of the viscous liquid to be such as to resist softening or deformation sufficiently long for the initial layers of liquefied/molten droplets to solidify and become sufficient rigid as to be able to support the following layers.

In accordance with this requirement, a supply of viscous liquid 108 is arranged to controllably supply viscous liquid into the vat under the control of a sensor 112. This sensor 112 is shown schematically connected to the injector 100. However, the apparatus according to this embodiment is not limited to this arrangement and suitable disposition of the sensor 112 can be used. This sensor 112 can comprise, by way of example, a range finder which can detect the level of the viscous liquid in the vat 102 and control it with respect to the level of the three-dimensional structure that is built up layer-by-layer by selective injection of droplets of liquefied/molten material from the ejector 100. Using a multi-target range finder enables both the liquid of the viscous liquid with respect to the level of the upper layer of the three-dimensional structure 200 which is being created, to be determined and the appropriate information provided to the NC controller 106. This input can, of course, also be used to control the distance between the injector nozzle and the upper layer of the three-dimensional structure 200.

Figure 2:
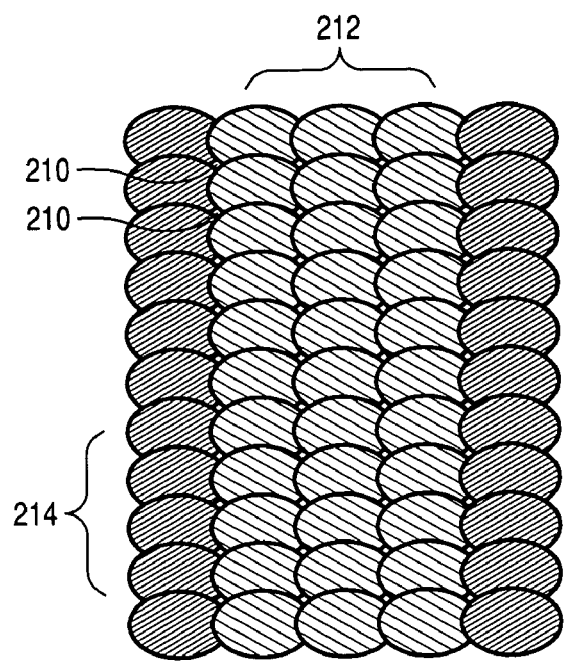
FIG. 2 is a schematic view showing the manner in which droplets of two different liquefied/molten materials can be layered together in accordance with a second embodiment of the invention.
Figure 3:
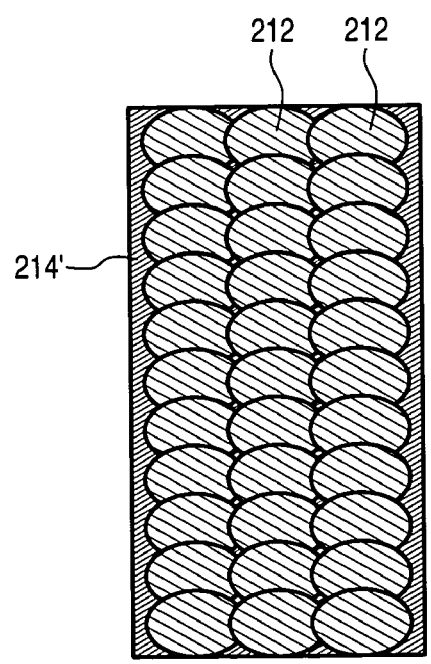
FIG. 3 is a schematic view of the arrangement shown in FIG. 2 following heat treatment wherein the solidified droplets of the outer material have been induced to soften, flow and to fill the voids between the droplets of the other material.

FIGS. 2 and 3 schematically depict a structure which can be produced in accordance with a second embodiment of the invention. This embodiment is directed to a situation which can occur when the droplets of the liquefied/molten material solidify without completely blending/fusing into a unitary solid with the immediately adjacent material. This, as depicted in FIG. 2, while producing a structurally sound structure is such as to be porous and include small voids 210 between the almost completely interfused droplets. The voids that are located on the external surface results in a product which has a rough exterior.

In the event that this void inclusive structure is undesirable, the second embodiment of the invention uses two different materials to construct the three-dimensional structure. The first material is used to construct what shall be referred to as the "core" 212 of the structure while the second material is used to construct the outer "peripheral" layer 214 portions of the structure. This is carried out using multiple ejectors which respectively eject the first and second materials in liquefied/molten form.

In this particular embodiment, the first and second materials are respectively different metals having different melting points. For example, silver solder and tin solder can be used as the first and second materials respectively, inasmuch as the melting points of these materials a sufficiently different.

As each layer of the structure is developed, the ejector that ejects the second material which has a melting point lower than the first material, is scanned and energized in a manner that results in a structure which is exemplified in FIG. 2.

By heat treating the structure which is shown in FIG. 2, it is possible to induce the second lower melting point material to soften and flow into the voids and recesses which tend to be left between the solidified droplets of the first material in the manner illustrated in FIG. 3 without inducing any heat related deformation of the primary or core structure formed of the solidified droplets of the first material.

This results in a smooth outer surface and an attractive finished structurally stronger product.

It is further possible that further controlled heat treatment can be used to induce inter-infusion of the second material into the first and thus induce alloying to take place.

The materials which are used in the above mentioned embodiments are only limited by the temperatures which the components of the ejector can tolerate and the capacity of the viscous support liquid to tolerate the thermal loads which are imparted by the ejection of the liquefied/molten materials.

While this example of the second embodiment has involved the use of first and second metals, it is possible that mixtures of metals and non-metals be used. For example, a core of thermoplastic resin could be used with copper as the second material. A metal plated plastic structure results. Apart from the aesthetic value of such a structure the body would also tend to become electrically conductive due to the permeation of the metal into the spaces between the hardened drops of resin and thus essentially throughout the structure.

A mixture of non-metals is also possible such as a combination of a thermoplastic resin and a UV setting resin. The core structure could be formed of the UV setting resin wherein each scan of the injector could be followed by the scan of a source of UV radiation. The thermoplastic resin could be ejected to form the outer peripheral portions of the structure and subsequently subjected to heat treatment which would soften the resin and allow it to flow into the porous structure formed by the UV setting resin, and thus lead to the formation of the structure such as that depicted in FIG. 3.

The above-mentioned heat treatment of the thermoplastic resin is carried out after the structure has been removed from the vat and/or the viscous liquid drained off or otherwise removed. That is to say, the viscous/support liquid could extend to materials that set and are soluble in a suitable solvent and thus can be washed off or dissolved. These materials can be soluble in either polar or non polar solvents (e.g. water, methanol, ethanol, methyethylketone, chloroform etc.).

A further embodiment of the invention makes use of the viscous support liquid as the second material. By using a suitable resin as the support liquid, the void filled structure which results from the imperfect interfusing of the droplets of liquefied/molten material, can be arranged to fill with the support liquid per se. After being removed from the vat and excess liquid being removed either by draining or some other process such as warming, rinsing or the like, the resin or other material which has impregnated into the structure and which remains retained within the voids via surface tension/capillary effects (for example only) can be permitted to remain unchanged or can alternatively, be induced to undergo a change such as polymerization (for example) in response to an external stimulus or stimuli.

It should be noted that the term liquefied is intended to include materials which are liquefied via an increase in temperature in addition to those which are dissolved and/or liquefied by other means. Thus, the expression liquefied/molten includes molten metals and other materials which are one of fluidized, dissolved or suspended in a carrier and thus in a condition wherein they can be ejected using a suitable ejection device which does not necessarily require the injection material to be electrically conductive.

Even though the present invention has been described with reference to only a limited number of embodiments, it will be understood that, given the preceding disclosure and the concepts which flow therefrom, a person of skill in the art of stereolithographics or the like type of fabrication techniques would be able to develop various modifications and variants of the disclosed techniques without the need of undue experimentation. It will be further understood that the scope of the invention is not limited to the specific arrangements which have been disclosed and that the scope of the invention is limited only by the appended claims.

What is claimed is:

1. A method of forming a three-dimensional object comprising:

ejecting drops of liquefied material into a vat using an ejector;

scanning the ejector in first and second mutually opposed directions to deposit and solidify said drops in a predetermined pattern to sequentially form layers of the three-dimensional object;

supplying a viscous liquid into the vat to a level which is essentially level with the top of a most recently formed layer of the three-dimensional object, wherein said viscous liquid both supports the material being formed into a three-dimensional object and fills in voids between drops of the material forming the three-dimensional object; and removing the object from the viscous liquid in the vat and then solidifying the viscous liquid remaining in the voids between solidified drops of the material forming the object.

2. A method as set forth in claim 1, wherein the step of ejecting comprises ejecting drops of first and second materials and controlling the drops of the second material to form a predetermined portion of the layer with respect to a portion of the layer which is formed of the drops of the first material.

3. A method as set forth in claim 2, further comprising heating the second material so that it flows into recesses defined by the solidified drops of the first material.

4. A method as set forth in claim 2, further comprising heat treating the first and second materials and forming an alloy of the same.

5. A method as set forth in claim 1, wherein the viscous liquid is highly viscous at room temperature and is not detrimentally reactive with the liquefied material.

6. The method of claim 1, further comprising raising the level of the viscous liquid to a level of a last-formed layer of the three-dimensional object.

7. The method of claim 1, wherein said viscous liquid comprises a resin.

8. The method of claim 1, further comprising depositing drops of the liquefied material to form at least a portion of a layer of the object directly on a surface of the viscous liquid, the viscous liquid supporting that at least a portion of a layer without other underlying support.

9. The method of claim 1, further comprising a sensor for sensing a level of the viscous liquid being poured into the vat, the sensor regulating a system for adding more viscous liquid to the vat.

10. The method of claim 1, wherein solidifying the viscous liquid remaining in the voids further comprises polymerizing the viscous liquid remaining in the voids.

* * * * *

UNITED STATES PATENT AND TRADEMARK OFFICE
CERTIFICATE OF CORRECTION

| | | |
|---|---|---|
| PATENT NO. | : 7,790,074 B2 | Page 1 of 1 |
| APPLICATION NO. | : 10/629742 | |
| DATED | : September 7, 2010 | |
| INVENTOR(S) | : Alfred I-Tsung Pan et al. | |

It is certified that error appears in the above-identified patent and that said Letters Patent is hereby corrected as shown below:

On the face page, in field (73), Assignee, in column 1, line 1,
delete "Houston-Packard" and insert -- Hewlett-Packard --, therefor.

Signed and Sealed this
Thirty-first Day of May, 2011

David J. Kappos
*Director of the United States Patent and Trademark Office*